(12) United States Patent
Leino et al.

(10) Patent No.: US 8,468,154 B2
(45) Date of Patent: Jun. 18, 2013

(54) DISTRIBUTION SYSTEM FOR DATA ITEMS

(75) Inventors: Ville V Leino, Turku (FI); Sami S Leino, Espoo (FI)

(73) Assignee: Spinlet Oy, Espoo (FI)

( * ) Notice: Subject to any disclaimer, the term of this patent is extended or adjusted under 35 U.S.C. 154(b) by 711 days.

(21) Appl. No.: 11/705,153

(22) Filed: Feb. 12, 2007

(65) Prior Publication Data

US 2008/0195943 A1 Aug. 14, 2008

(51) Int. Cl.
*G06F 17/30* (2006.01)
(52) U.S. Cl.
USPC .......................................... 707/724; 707/752
(58) Field of Classification Search
USPC .............................................................. 707/10
See application file for complete search history.

(56) References Cited

U.S. PATENT DOCUMENTS

| | | | |
|---|---|---|---|
| 6,741,864 B2 | 5/2004 | Wilcock et al. | |
| 7,415,424 B1 * | 8/2008 | Donner | 705/5 |
| 2003/0006913 A1 | 1/2003 | Joyce et al. | |
| 2004/0010204 A1 * | 1/2004 | Weber et al. | 600/547 |
| 2004/0029622 A1 | 2/2004 | Laroia et al. | |
| 2004/0225635 A1 * | 11/2004 | Toyama et al. | 707/1 |
| 2005/0055353 A1 | 3/2005 | Marx et al. | |
| 2005/0192727 A1 | 9/2005 | Shostak et al. | |
| 2005/0262256 A1 * | 11/2005 | Cheng | 709/231 |
| 2006/0080286 A1 * | 4/2006 | Svendsen | 707/3 |
| 2006/0208927 A1 * | 9/2006 | Poor et al. | 340/995.1 |
| 2006/0241859 A1 * | 10/2006 | Kimchi et al. | 701/208 |
| 2006/0271277 A1 | 11/2006 | Hu et al. | |
| 2006/0285150 A1 * | 12/2006 | Jung et al. | 358/1.15 |
| 2007/0061266 A1 | 3/2007 | Moore et al. | |
| 2007/0162502 A1 * | 7/2007 | Thomas et al. | 707/104.1 |
| 2007/0179750 A1 * | 8/2007 | Burfeind | 702/188 |
| 2007/0287473 A1 * | 12/2007 | Dupray | 455/456.1 |
| 2008/0074423 A1 * | 3/2008 | Gan et al. | 345/427 |
| 2008/0104649 A1 * | 5/2008 | Naaman et al. | 725/116 |
| 2008/0189249 A1 * | 8/2008 | Petakov et al. | 707/3 |

FOREIGN PATENT DOCUMENTS

| | | |
|---|---|---|
| DE | 103 51 684 A1 | 6/2005 |
| JP | A 2006-24228 | 1/2006 |
| KR | 2004-83238 | 10/2004 |

OTHER PUBLICATIONS

Dec. 23, 2011 Office Action issued in U.S. Appl. No. 13/228,106.
Dec. 6, 2012 Office Action issued in U.S. Appl. No. 13/228,106.

\* cited by examiner

*Primary Examiner* — Neveen Abel Jalil
*Assistant Examiner* — Kevin L Young
(74) *Attorney, Agent, or Firm* — Oliff & Berridge, PLC

(57) ABSTRACT

Distribution system for data items where information on amounts of topics may be used to scope further actions on the information. Data items are created topically in various locations, provided with position-based annotation and made publicly available. Search on desired data items is scoped using views that show the amount of available data items for one or more sub-areas of a geographical area.

35 Claims, 8 Drawing Sheets

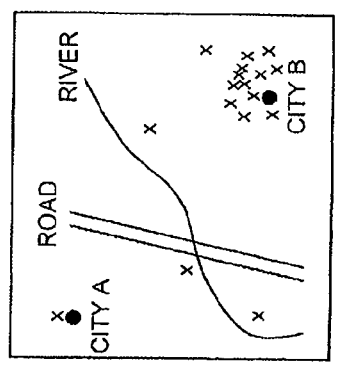
FIG 8A.
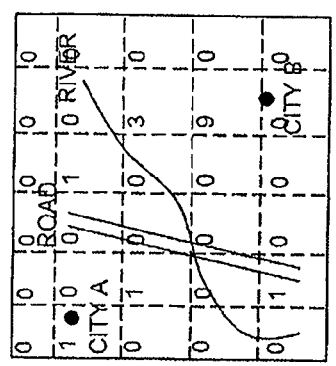
FIG 8B.
HITS:
CITY A – 3 HITS
CITY B – 13 HITS
FIG 8C.

DISTRIBUTION SYSTEM FOR DATA ITEMS

FIELD OF THE INVENTION

The present invention relates to information techniques and especially to provision and distribution of information.

BACKGROUND OF THE INVENTION

Conventionally people have been acquiring knowledge on various topics and their points of interest through established channels that feed information in a defined way in a defined time. It has been easy to turn to a particular page of a particular newspaper to find the news on a train crash the day before, or to watch particular news broadcast to hear the latest update on the coup in the planned vacation resort. In return, it has been accepted that between the occurrences and the time the information on the occurrence becomes available is a delay, and that the choice of subjects, as well as the extent and scope of their coverage follows a defined pattern characteristic for the policy adopted for the channel. Furthermore, the amount of reporters is limited so many subjects are missed.

As a result of increased use of Internet, and other advanced communication mechanisms, the forms of providing and distributing information has recently changed. There are Internet sites where people chat on any chosen topic and bring in news and views. Succulent stories circulate quickly in the Internet and sites comprising content on such story may very quickly be visited by a mass of users. There are even sites where individual users may post video clips on any subject. Through such site postings information on any subject may become available with minimal delay. Furthermore, each of the posted contents represents an editorial view of the person who created the content and thus by viewing several contents and representations on one occurrence, the authenticity of the information, and thereby the accuracy of the news is improved. Additionally, due to the large number of virtual reporters, the amount of subjects that may be continuously covered is huge. However, material that is created practically randomly by a plurality of users and is made available in various different sites and made accessible in various different forms are extremely difficult to search systematically. The search engines are powerful but rely only in use of search terms. Since the creators typically use different terms in naming their content, finding a desired piece of information on a particular topic is yet a matter of good luck more than a result of systematic operations.

SUMMARY OF THE INVENTION

An object of the present invention is thus to solve overcome the above problems such that information on amounts of topics may be acquired and used to scope further actions for searching and retrieving the information. The objects of the invention are achieved by a method, a system, a user terminal, an application node, a computer program product, or a computer program distribution medium, which are characterized by what is stated in the independent claims. The preferred embodiments of the invention are disclosed in the dependent claims.

The invention is based on the idea of creating data items topically in various locations, provide the data items with position-based annotation and make the data items availably publicly. Search on desired data items may then be scoped using data item views that show the amount of available data items for one or more sub-areas of a geographical area corresponding to the view.

BRIEF DESCRIPTION OF THE DRAWINGS

In the following the invention will be described in greater detail by means of preferred embodiments with reference to the attached [accompanying] drawings, in which

FIGS. 8A, 8B and 8C show exemplary data item views;

SOME EMBODIMENTS OF THE INVENTION

It is appreciated that the following embodiments are exemplary. Furthermore, although the specification may in various places refer to "an", "one", or "some" embodiment(s), reference is not necessarily made to the same embodiment(s), or the feature in question does not only apply to a single embodiment. Single features of different embodiments may be combined to provide further embodiments.

The present invention is applicable to a communication system that is capable of delivering data items between communicating endpoints. A variety of systems applying a variety of communication technologies may be used separately or in combinations to implement the embodiments of the invention. Communication systems and technologies evolve continuously, and embodiments of the invention will require a number of modifications that, as such, are obvious for a person skilled in the art. All words and expressions of this specification should be interpreted broadly, as they are intended merely to illustrate, not to restrict, the embodiments.

Figure 1:
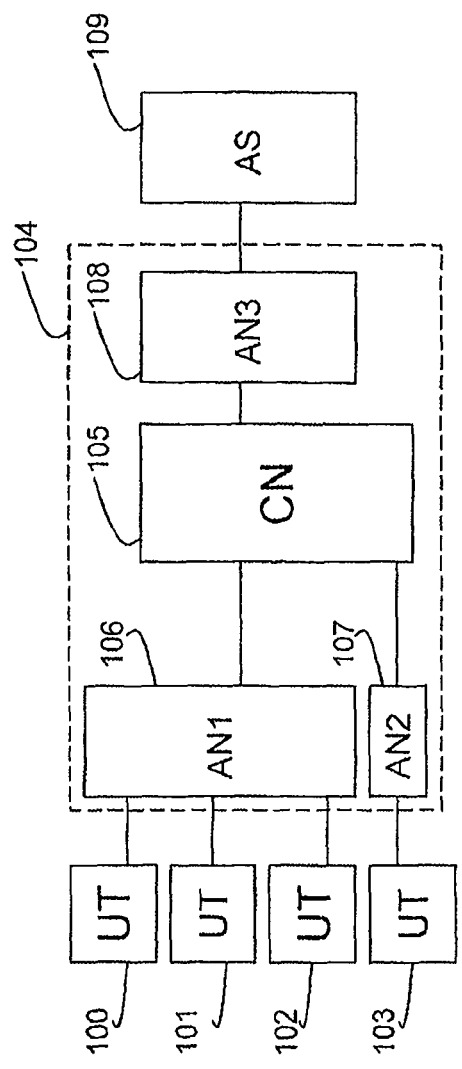
FIG. 1 illustrates a number of communication endpoints configured to communicate over a communication network.

In the following, some embodiments of the invention will be described in the context of an exemplary communication system that provides fixed and wide area connectivity to mobile user equipment, however, without restricting the embodiment to any particular connectivity types. An embodiment of a communication system according to the present invention is illustrated in FIG. 1. It should be noted that only elements necessary for illustrating the invention are shown. It is apparent to a person skilled in the art that actual systems comprise other functions and structures that are not necessarily discussed or depicted in more detail herein.

The configuration shown in FIG. 1 is a logical representation of basic system architecture of an embodiment of the present invention and identifies functional entities thereof. Each of the shown entities represents a grouping of functional entities. On the other hand, each of the functions may be realized in a single physical entity or be distributed over multiple physical entities.

FIG. 1 illustrates a number of communication endpoints 100, 101, 102, 103, 109 that are configured to communicate over a communication network 104. The communication network 104 typically comprises at least one or more core networks 105 that provide network services, and one or more access networks 106, 107, 108 through which the communication endpoints access these core network services. Core network 105 represents a transmission facility that interconnects lower-speed distribution networks, like access networks. Access networks 106, 107, 108 represent transmission facilities that provide final transmission laps to the communication endpoints 100, 101, 102, 103, 109. Communication endpoints represent herein system elements that source and sink data streams of a defined communication protocol layer. In the current embodiment an endpoint may be implemented in any fixed, mobile or portable device with connectivity to at least one access network of the communication network 104 and comprising an application that is configured to receive and transmit information over the protocol layers applied in connectivity of the device. Communication endpoints shown, in FIG. 1 are illustrated by means of a number of user terminals 100, 101, 102, 103 as well as an application node 109, connected to the communication network 104.

As an access network AN1 for mobile user terminals, a communication network 105 may comprise a radio network subsystem 106. The radio network subsystem 106 may comprise one or more radio network controllers and one or more base tranceiver stations. A base tranceiver station performs air interface layer processing (for example, channel coding and interleaving, rate adaptation, etc.) to interface with user equipment 100, 101, 102, 103. The base transceiver stations form a coverage area within which the mobile user equipment may send and receive information. As the user moves around the network, the mobile user equipment will handoff to various cell sites during calls, or while waiting between calls it will reselect cell sites. A radio network controller is a network node responsible for the control of the radio resources of one or more base tranceiver stations and interfaces the core network 105. For a person skilled in the art it is clear that the radio access network AN1 may comprise one or more interconnected radio network subsystems.

Mobile user terminal is user equipment primarily arranged to operate in a cellular network. By handing over the connection from one cell to another cell, mobile user equipment may access network services also during movement. Mobile user equipment functions within a radio access network infrastructure together with the software, applications, and content associated with the device, and thereby provides to its user connectivity. A user equipment may be a simple terminal that is able to communicate with one media type service (for example, speech) only or it can range to a terminal for diverse services that acts as a service platform and supports loading and execution of various functions related to these services. In the current exemplary embodiment of accessing the radio access network, the mobile user terminal may be implemented as any mobile equipment or any type of computer device to which a fixed or detachable radio interface element (for example, a card phone) has been coupled to provide a connection to the radio access network.

Other types of user terminals are connected to the system by means of their respective access types. A communication network 105 may also comprise a fixed network subsystem 107 to provide access network AN2 for fixed user terminals. A fixed network subsystem comprises a number of fixed access points to which user terminals may be connected in order to connect to the services of the core network. Fixed access points may be used by fixed and portable terminals. A portable terminal may be moved from point to point but may only used at a fixed point. A fixed terminal is substantially permanently connected to a fixed access point assigned to it. It should be noted that the invention may be applied in mobile, portable and fixed user terminals.

A communication endpoint does not need to be operated by a user but may be implemented as computer that serves other entities accessible through the same communication system by operating as the other entities request. An application node 109 represents here a server or a program in a computer in a distributed network that provides the business logic for an application that implements the functions according to the invention. Depending on the implementation, the application node 109 may be connected to the communication network 105 directly without an access network, or indirectly through an access network AN3 108. In FIG. 1, AN3 represents a telecommunications network between a local exchange of the core network and the application node 109.

Figure 2:
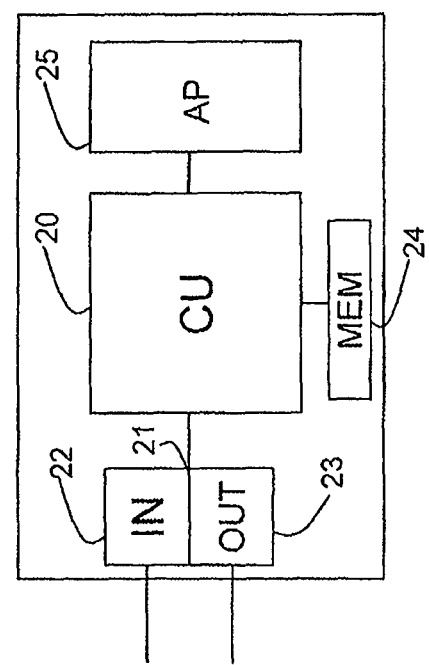
FIG. 2 illustrates a reference configuration of an application node in which the invention may be embodied.

FIG. 2 illustrates a functional description of an application node in which the invention may be embodied. An application node may be any networked computer element that is accessible to the participating user equipment using their respective primary connectivity type. Advantageously an application node is also capable of accessing the charging interfaces of the participating user equipment for the purpose of generating charging records on the implemented operations.

The application node of FIG. 2 comprises a processing unit 20, an element for controlling the operations and executing functions of the application node. The processing unit 20 comprises an arithmetic logic, a number of special registers and control circuits. The processing unit may be implemented as a single integrated circuit or as a combination of a number of integrated circuits.

The application node of FIG. 2 also comprises a communication unit 21 configured with receiving unit 22 for receiving information from the network interface and processing it for inputting to the processing unit 20, as well as with transmitting unit 23 for receiving information from the processing unit 20, and processing it for sending via the network interface. The implementation of such a communication unit, is generally known to a person skilled in the art. The connection type used for communication with other communication endpoints is not relevant for the invention;- basically the application node may operate towards the other endpoints through its own access network, the core network and any access network of the respective communicating party. The application node may also be implemented as part of the core network.

Connected to the processing unit is a memory unit 24, a data medium where computer-readable data or programs or user data can be stored. The memory unit typically comprises storage elements that allow both reading and writing (RAM), and storage elements whose contents can only be read (ROM). The application node may also comprise a user interface unit (not shown) for inputting data by the user for internal processing in the application node, and for outputting user data from the internal processes of the application node. Examples of applicable input devices comprise a keypad, a touch screen, a microphone, or the like. Examples of applicable output devices comprise a screen, a touch screen, a loudspeaker, or the like. Through the user interface unit an administrator of the application node may control the operations of the application node and provision possible new users for the service.

According to the invention, the application node of FIG. 2 further comprises an application unit 25, an element that comprises a logical collection of functions for implementing the embodiment of the present invention. The application unit may be implemented, for example, as series of computer tasks defined in a programming language. For a person skilled in the art it is cleat that a combination of functions that provide a capability for the interworking of application node invocations for a specific purpose may comprise functions specifically configured in the application unit and/or basic functions available in the application node. The processing unit, the communication unit, the memory unit and the application unit of the application node are electrically interconnected for performing systematic execution of operations on the received and/or stored data according to predefined, essentially programmed processes of the unit. In solutions according to the invention, these operations comprise the basic and embodied functionality of the application node as will be described in more detail in the following.

Figure 3:
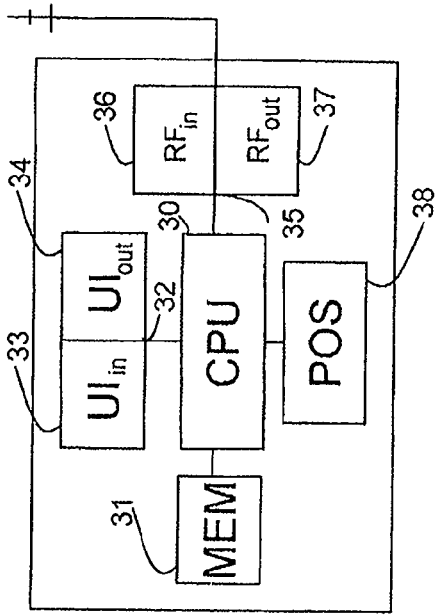
FIG. 3 illustrates a functional description of a user terminal in which the invention may be embodied.

Correspondingly, FIG. 3 illustrates a functional description of a user terminal in which the invention may be embodied. A mobile user equipment is used as an example. Also the user equipment comprises a processing unit 30, an element for controlling the operations and executing functions of the user equipment. The processing unit 30 comprises an arithmetic logic, a number of special registers and control circuits, and may be implemented as a single integrated circuit or as a combination of a number of integrated circuits.

Also connected to the processing unit is a memory unit 31, a data medium where computer-readable data or programs or user data can be stored. The memory unit may comprise RAM and ROM elements. The user equipment UE also comprises a user interface unit 32 with user input unit 33 for inputting data by the user for internal processing in the user equipment, and user output unit 34 for outputting user data from the internal processes of the unit. Examples of applicable input devices comprise a keypad, a touch screen, a microphone, or the like. Examples of applicable output devices comprise a screen, a touch screen, a loudspeaker, or the like.

The mobile user equipment UE also comprises a radio communication unit 35 configured with a receiving unit 36 for receiving information from the base transceiver station of the radio network subsystem over the air interface and processing it for inputting to the processing unit 30, as well as with a transmitting unit 37 for receiving information from the processing unit 30, and processing it for sending via the air interface to the base tranceiver station of the radio network subsystem. The implementation of such radio communication units is generally known to a person skilled in the art.

The user equipment may advantageously comprise also a positioning unit 38 for determining the geographical position of the user equipment and provide the position data for subsequent use in the functions of the user equipment. An example of positioning units is an integrated Global Positioning System (GPS) device. It should be noted that a separate positioning unit is optional in that the position information associated with data items can be provided in other ways also, for example input manually by the user. Other automatic positioning schemes are also available, for example, positioning based on base tranceiver station identity or measurements carried out in the base transceiver stations. The user equipment may also comprise one or more local communication units (not shown) for enabling transmission and reception of information locally, for example, a device implementing any of the following technologies: Bluetooth, Infrared Data Association (IrDA), Radio Frequency Identification (RFID), Digital Enhanced Cordless Telecommunications (DECT), Dedicated Short Range Communications (DSRC), HIPERLAN, HIPERMAN, Institute of Electrical and Electronics Engineers (IEEE) 802.11, Ultra-wideband (UWB), Institute of Electrical and Electronics Engineers (IEEE) 802.16 (WiMAX), xMax, ZigBee, Institute of Electrical and Electronics Engineers (IEEE) 802.16 (WPAN), Wireless USB. The user equipment also comprises one or more interface connections for direct provisioning of terminal software. Access to such terminal software format is available to a restricted group of users only. It is clear that the user equipment may also comprise other functional units without deviating from the scope of protection.

Figure 4:
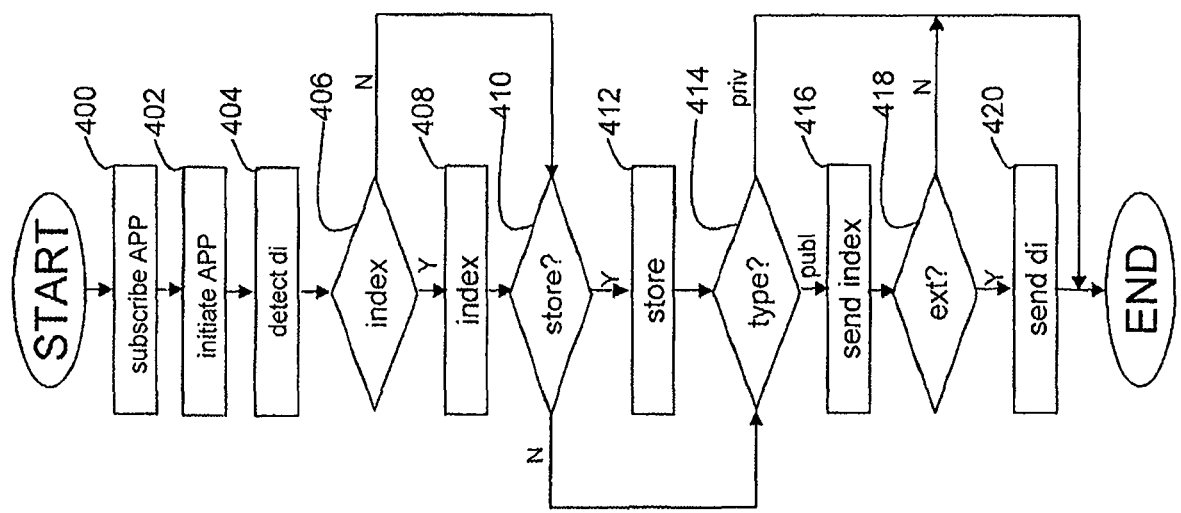
FIG. 4 illustrates a procedure for providing data elements in a user terminal illustrated in FIG. 3.

FIG. 4 illustrates a basic procedure for providing data elements in a user terminal illustrated in FIG. 3. The procedure begins in a state where the user terminal is switched on and registered into the communication system and thus ready to send and receive data over the air interface. In step 400, the user terminal subscribes an application program APP. Subscription refers here to a contract between an application service provider and a subscriber. At contracting a set of communication protocols are agreed and possibly a charging relationship is formed. In the user terminal, the subscription is provisioned by means of an application program made accessible in the user terminal. The application program may be delivered to the user terminal through the communication unit over the air interface, through any of the local communication interfaces of the user terminal, or provisioned directly to the user terminal through the interface connections of the user terminal.

At some point of operation the user initiates (step 402) the application, for example by entering a defined key sequence in the keypad, or activating a defined icon in the screen of the user terminal. After initiation the application provides for user activation a function for data item generation. It is clear that in a full application implementation, various functional or other options available to the user at a particular operating stage are provided as a combined selection view, where the selection can be made in several ways. The layout and implementations of the views and menus through which the function is made available to the user are not relevant for the embodiment and will not be discussed in more detail herein.

At some point of operation the user equipment detects (step 404) a data item. A data item is a combination of one or more information elements, joined together at least for transmission purposes. Information elements of the data item may comprise user data or index data. User data carries content that may be consumed by users, index data comprises additional information that is associated with the data item but is not essential in consumption of the data item. User data information elements in the data item may be in any format in any media type. Index data information elements need to be in at least one of the formats that can be interpreted by various communication parties A data item may be generated in the user terminal, received locally into the user terminal through any of the local communication devices, or received from another user via the communication system. Data items may be generated in the user terminal by photographing, video imaging, recording, inputting text, and adopting output information from a user terminal application, like a game, for example. By choice of the user or as an automated function of the user terminal, information on the existence of the data item is input to the application program and a procedure for data item processing is initiated in the user terminal.

The user terminal checks (step 406) whether to index the data item. As discussed above, indexing may be performed by including indexing information elements to the data item.

Indexing may be performed to all data elements or only to selected data items. The decision whether a data item is to be indexed may be prompted from the user via the user interface or it may be determined automatically according to a predefined scheme. For example, at subscribing the user may create a profile that includes one or more indexing conditions that a data item need to fulfill in order to be indexed. For example, a condition may include a definition that data items created with a camera integrated to the user equipment will by default be indexed. It is clear that a variety of schemes may be applied without deviating from the scope of protection.

According to the invention, the indexing data comprises an information element that indicates a position to be associated with the data item. Indexing data may be generated automatically by the user terminal and/or prompted from the user. For example, the position information element may be derived as a coordinate determined with the positioning unit of the user terminal or provided as a name of a location (e.g. 'Helsinki') typed in by the user. In addition, the user terminal may include in the data item a number of other indexing information elements, for example, an indexing information element that indicates the data item to be public, an indexing information element that indicates a time of generation of he data item, an indexing codeword that describes the subject of the content, for example. A variety of information elements applicable for annotating the content may be used without deviating from the scope of protection. All or part of the indexing information elements of the data item are combined into an indexing record of the data item.

If the check is positive, the user equipment will perform indexing (step (408). If the check is negative, the procedure will continue directly to the next step where the user terminal checks (step 410) whether or not to store the data item into a user terminal memory that is assigned for the use of the application. If the check is positive, the data item is stored (step 412) to the user terminal. If the check is negative, the procedure will continue directly to the next step where the user equipment, according to the invention, further checks (step 414) whether the data item will be treated as 'public' or 'private'.

Public data item refers to data items that after their submission to the system are inherently accessible to users of the application service. Access to public data items may be restricted by additional control definitions provided in the application program protocols. Private data item refers to data items that are inherently accessible only to the user that submits them to the system. Access to private data may be granted by additional control definitions provided in the application program protocols. The decision whether a data item is to be treated as public or private may be prompted from the user via the user interface or it may be determined automatically according to a predefined scheme. For example, at subscribing the user may create a publication profile that includes one or more conditions that a data item need to fulfill in order to be marked public. For example, a condition may include a definition for an area and a definition that data items created with a camera integrated to the user equipment within that defined area may by default be marked public. It is clear that a variety of schemes may be applied without deviating from the scope of protection.

If the data item is to be treated as public, the user terminal sends (step 416) the indexing record of the data item to a defined application node. The address of the application node is configured to the user terminal, for example, at subscribing the application service and the connectivity to the application node is provided via the communication system. If the data item is to be treated as private, the indexing record is not forwarded outside of the user equipment, and the embodied procedure terminates.

The user terminal further checks (step 418) whether to transmit the data item to a predefined external database assigned to the application service. If the check is positive, the user terminal sends (step 420) the data item to the predefined external database. If the data item is to be treated as private, the data item is not forwarded outside of the user equipment, and the embodied procedure terminates.

Figure 5A:
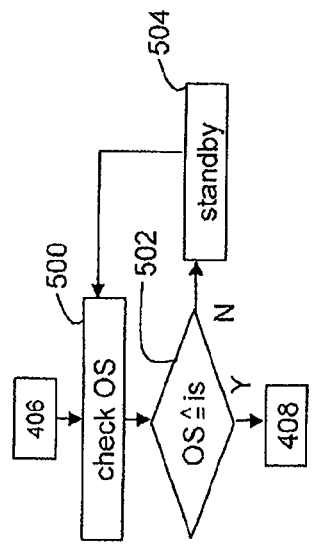
FIGS. 5A and 5B illustrate further embodiments of the basic procedure.

FIG. 5A illustrates a further embodiment of the basic procedure of FIG. 4. Indexing of the data items may be performed directly after the decision to index is available. Alternatively, the user terminal may be configured to detect operational states (OS) during which indexing may be performed with least interference to other essential procedures of the user terminal. An example of such operational states is an idle state during which the user terminal is not sending or receiving user data through the telecommunication system. Such states are referred to as indexing states (IS). The procedure illustrated in FIG. 5A begins when the user terminal has detected that indexing would be performed. In step 500, the user terminal checks (step 502) its operating state to see whether is matches with the one or more predefined indexing states. If the check is positive, the user terminal continues to step 408. If the check is negative, the user terminal performs a standby operation (step 504) after which it again checks whether the indexing state exists.

Figure 5B:
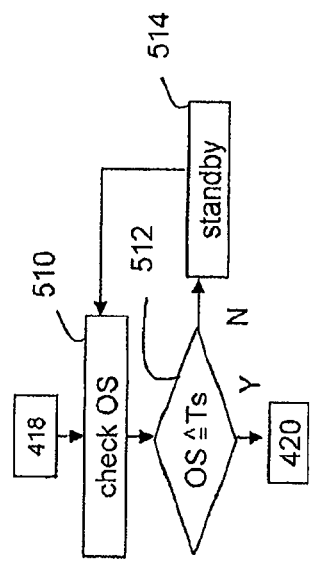

FIG. 5B illustrates another further embodiment of the basic procedure of FIG. 4. Data items generated by a user terminal may be stored in one or more of the memories in the user terminal, or transmitted for storing to an external database. Data items that are transmitted from the user terminal to an external storage may be transmitted directly after the decision to transmit is available. Alternatively, the user terminal may be configured to detect operational states (OS) during which transmission of data items may be performed with least interference to other essential procedures of the user terminal. An advantageous state for initiating transmission of data items is, as in the embodiment of FIG. 5a, the idle mode of the user terminal. Such states are referred to as transmission states (TS). The procedure illustrated in FIG. 5B begins when the user terminal has detected that a data item would be transmitted. In step 510, the user terminal checks (step 512) its operating state to see whether is matches with the one or more predefined transmission states. If the check is positive, the user terminal continues to step 420. If the check is negative, the user terminal performs a standby operation (step 514) after which it again checks whether the transmission state exists.

The standby operation in FIGS. 5A and 5B may comprise waiting for a predefined period before performing a new check. Alternatively, the standby operation may comprise interaction with the mobility management and radio resource functions of the user terminal such the procedure will be paused, and as soon as the desired indexing or transmission state (for example, the idle mode of the user terminal) is entered, the procedure will be automatically resumed. Other standby operations are possible without deviating from the scope of protection.

Figure 6:
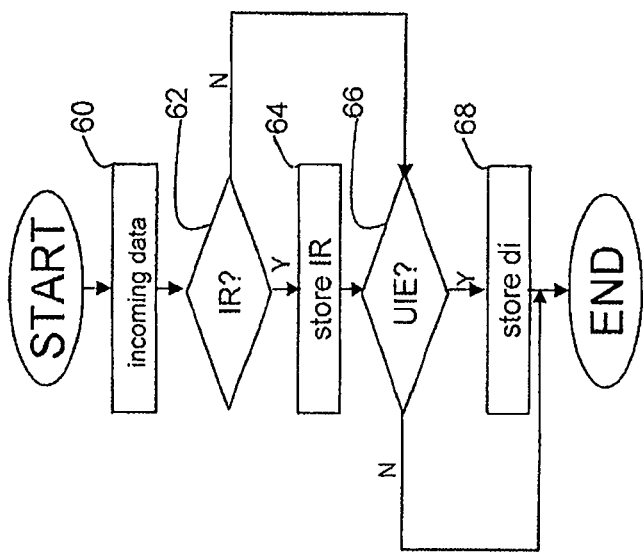
FIG. 6 illustrates a basic procedure for receiving data elements in an application node.

FIG. 6 illustrates a basic procedure for receiving data elements in an application node illustrated in FIG. 2. In the beginning the application node is switched on detects (step 60) incoming data. The application node checks (step 62) whether the data comprises an indexing record of a data item. If the check is positive it stores (step 64) the indexing record and thus makes the record and the indexing information elements into a data item index registry. The data item index registry comprises indexing records of data items received and recorded by the application node. This data item index registry is available for search and/or data retrieval as will be described in more detail later on. The storing step may comprise further functions where the index is, for example, checked, verified, and/or complemented with indexing information elements by the application node. If the check is negative, the procedure continues directly to the next step where the user terminal checks (step 66) whether the data comprises user data information elements (UIE). If the check is positive it stores (step 68) the user data information elements and thus makes them available for data retrieval. Data elements may be stored in a database integrated to or directly accessible from the user terminal, or in one or more external databases accessible through the communication system. The application node will record the storing operations such that for data items whose indexing record is available for search, the address of the storage is derivable for data retrieval.

It is appreciated that provision of data items in a plurality of locations and making them publicly available provides a new independent media channel that considerably increases the amount of consumable information. The information comes directly from content generators that, for some consumers, may represent increased authenticity of the newscast. The information may be made available without editorial delays inherently associated with the conventional news broadcasts. The associated position information enables a variety of search function that may be utilized to improve the accuracy of the searches, as will be discussed herein.

Figure 7:
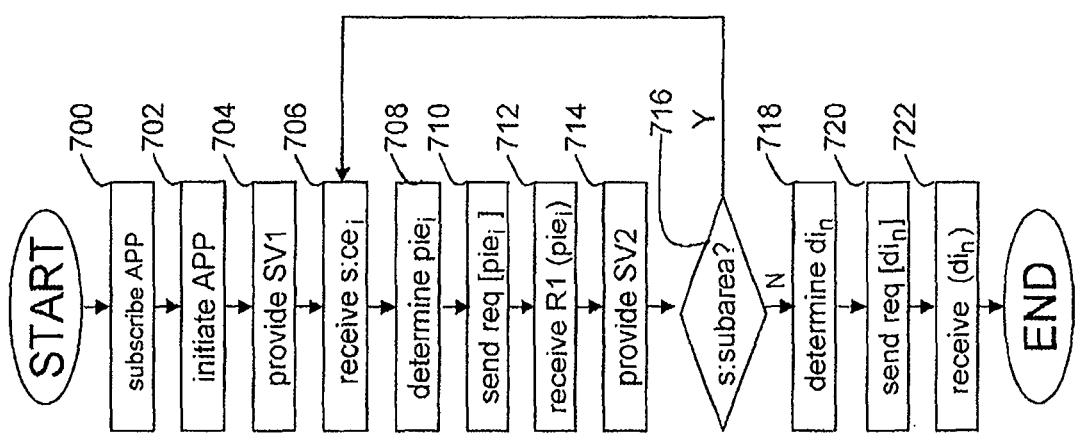
FIG. 7 illustrates a basic procedure for selecting and retrieving data elements in a user terminal.

FIG. 7 illustrates a basic procedure for selecting and retrieving data elements, for consumption in a user terminal illustrated in FIG. 3. The application service may be separately such that a user may act as a provider of data elements or as a consumer of data elements or as both. The embodiment of FIG. 7 illustrates operations from the point of view of a user terminal used for consuming the data elements. For conciseness, definitions for same terms are not repeated here, but reference is made to description of FIG. 4. Thus the procedure begins in a state where the user terminal is switched on and registered into the communication system and thus ready to send and receive data over the air interface. In step 700, the user terminal subscribes an application program APP. At some point of operation the user initiates (step 702) the application.

The application provides (step 704) for user selection an area selection view that comprises a plurality of coordinate elements, where each coordinate element corresponds to an actual geographical area, and thereby to a group of one or more position information elements that may be included in the indexing records of data items. In the area selection view the user is prompted to select one or more coordinate elements and thereby choose a geographical area for a subsequent data item view. As discussed earlier, the format of the menus and selections is, as such, not relevant for the scope of protection. Furthermore, the area selection is optional such that the user may be merely shown a common view that illustrates the geographic area from which data items will by default be searched. However, advantageously, the area selection view provides options for scoping the search to a defined geographical area of interest. In addition to position-related restrictions, the user may be provided with a possibility to define some further search conditions, based on the other indexing information elements. For example, the further search conditions may limit the search to data items generated within a defined time period, or data items that comprise a particular indexing codeword, or data may be searched by a group of users that have generated data or any combination of these etc.

When the user terminal receives (step 706) a selection of one or more coordinate elements $ce_i$, the user equipment determines (step 708) the position information elements $pie_i$ that correspond to the selected coordinate elements and sends (step 710) to the application node a message that comprises an indication on the determined position information elements $pie_i$ and a request to provide information on data items, the indexing record of which comprises any of the determined position information elements. The information requested from the application node on data items may vary according to the implementation, but comprises at least the position information for each of the data items to be included in the data item view.

When the user terminal receives (step 712) the requested information it outputs (step 714) to the user a data item view that provides information on the availability of data items associated by indexing with the selected geographical area, the availability information provided in such form that the amount of available data elements in defined subareas of the geographical area of the data item view is, shown. The data item view again that comprises a plurality of coordinate elements, where each coordinate element corresponds to an actual geographical area, and thereby to a group of one or more position information elements. In addition the data item view provides an indication on the availability of data items in that particular geographic area. A data element is available in a geographic area when its position information element corresponds to the coordinate element that, on the other hand, corresponds to the particular geographic area. The format of the first selection view and the indications on data items may vary according to the implementation. FIG. 8A shows an exemplary data item view where the view is output in the user terminal screen as a map such that one pixel of the map corresponds to an actual geographical area. In case the search base formed by the indexing records of data items in the data item view comprises at least one data item indexed with a position information element that corresponds with the coordinate element, the pixel corresponding to the coordinate element is shown as contrasted from the map. In FIG. 8A, the contrast is accomplished by an asterisk output on the corresponding coordinate element. A further effect may be produced by changing the brightness or color of the pixel according to the amount of data items per the coordinate element of the pixel.

FIGS. 8B and 8C shows alternative views illustrating the availability of the same data items in the same geographic area. In FIG. 8B the geographic area is divided into a mesh of subareas and the number of available data items in each subarea is printed in the corner of the respective subarea. In FIG. 8C the geographic area is divided into two subareas corresponding to the division of the land around the two cities CITY A and CITY B by the river RIVER. The number of data items in each of the subareas is listed in the data item view. For a person skilled in the art it is clear that alternative implementations of the data view may be used without deviating from the scope of protection.

The granularity of the first view may be insufficient so the selection by the user may comprise a selection of one of the subareas such that the subarea becomes a new geographic area of interest. Thus the user terminal checks (step 716) whether the selection points to a subarea of the data item view. If the check is positive, the procedure will return to step 706 with a new set of coordinate elements $ce_i$. If the check is negative, the selection points to one or more data items that the user wishes to be retrieved. It is appreciated that the data item views may be configured to change according to the level of detail. For example, viewing the availability of data items may started from a geographic area that corresponds to a map view of whole USA and scoped in successive data item views to the level of a list of data items in a particular airport in USA. From this list the user may select the data items he wishes to download to his or her user terminal.

The user terminal determines (step 718) the data items $di_n$ selected for retrieval and sends (step 720) to the application node a a message that comprises an indication on the selected data items $di_n$ and a request for retrieving the data items. The procedure end when the user terminal receives (step 722) the requested data items.

Showing the availability of data items in the context of their respective geographical area provides for the user a consistent and systematic way to approach the desired subject and search for the relevant data items.

Figure 9:
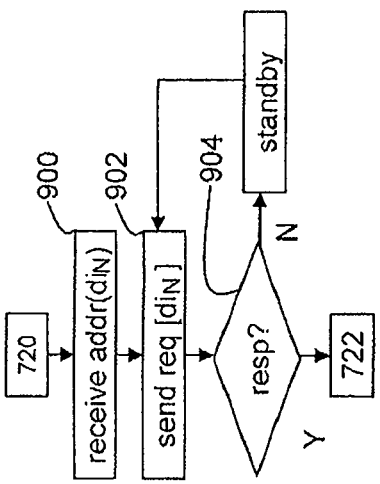
FIG. 9 illustrates a further embodiment of the basic procedure for selecting and retrieving data elements in a user terminal.

FIG. 9 illustrates a further embodiment of the basic procedure of FIG. 7. As will be discussed in more detail later on, the retrieval of data items may be performed by the application node such that after requesting the data items, the user terminal may receive the retrieved data items or notification from the application node on unsuccessful retrieval of one or more data items. Such case is illustrated in FIG. 7. Alternatively, the application node may act only as an indexing party and provide addresses to the data storages from which the data items may be retrieved. For example, some data items may be stored and available for download in the user terminal where it was originally created. In such situation the multiplicity of storages that are uncontrollably available or unavailable for access, and the delay on the retrieval operation may exceed the service session, i.e. the time that the user is willing to remain standby to interact for retrieving the data item. This could potentially severely handicap the user experience of the service. The disadvantage may, however, be avoided by an arrangement shown in FIG. 9.

The procedure of FIG. 9 begins when the user terminal has sent a request for data items $di_n$ to the application node and the application node does not provide the data item but an address $Addr(di_n)$ from which the data item may be retrieved. When the user terminal receives (step 900) the address $Addr(di_n)$ it generates a request for the data item and sends (step 902) it to a communication endpoint in the provided address. The user terminal checks (step 904) whether a response is received within a defined period of time or not. If the check is positive, it means that the communication endpoint is accessible, the response comprises the data item and the procedure may continue as in step 722 of FIG. 7. If not, the communication endpoint is not accessible, and the retrieval is not successful. In response to a negative check, the user terminal initiates a standby procedure (step 906) after which the request is resent to the communication endpoint. The standby procedure may be any procedure that keeps the data retrieval procedure automatically running such that whenever the communication endpoint becomes accessible again, the data item will be automatically retrieved and provided for consumption. Standby operation may comprise, for example, waiting for a predefined period before performing a new check. Other standby operations are naturally possible without deviating from the scope of protection.

Figure 10:
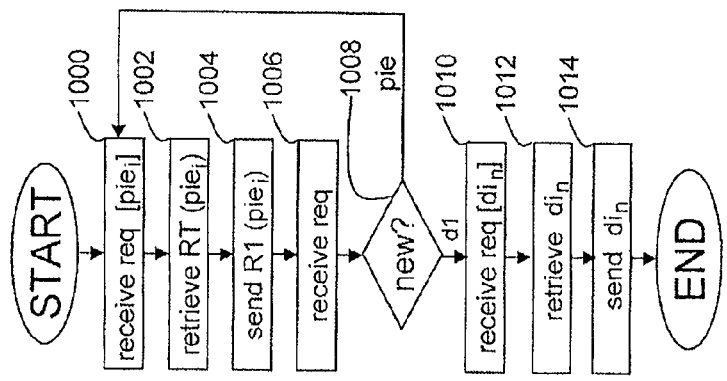
FIG. 10 illustrates a basic procedure for retrieving data elements in an application node.

FIG. 10 illustrates a basic procedure for retrieving data elements in an application node embodied in FIGS. 2 and 6. If not specified otherwise, definitions of similar terms and notations may be referred from the description of the earlier embodiments. The procedure begins when the application node is switched on and the application service program is running in the application node. A plurality of data items are received and recorded to the data item index registry of the application node. The application node receives (step 1000) from one of the user terminals a message that comprises an indication on determined position information elements $pie_i$ and a request to provide information on data items, the indexing record of which comprises any of the determined position information elements. The application node searches the data item index registry and on the basis of information in the indexing records generates the requested information on the selected data items $RI[pie_i]$. It should be noted that other indexing information elements may be additionally used for limiting the amount of searched data items. Provision of search criteria for conventionally annotated information is generally known to a person skilled in the art and will not be described here in more detail.

The application node generates a response comprising the requested information $RI[pie_i]$ and sends (step 1004) it to the requesting user terminal. When a new request from the user terminal arrives (step 1006), the application node checks (step 1088) the type of the new request. In case the new request again comprises an indication on determined position information elements $pie_i$ and a request to provide information on associated data items, the procedure returns to step 1000 with a new set of position information elements. In case the new request comprises a request to retrieve one or more data items (step 1010), the application node initiates a procedure for retrieving (step 1012) the requested data item or data items. When data items are retrieved, the application node sends (step 1014) the data items to the requesting user terminal. Data items may be forwarded to the user terminal according to a predefined schedule, for example, one by one at the time they become available, combined into groups and delivered by a separate invitation that the user terminal gives when it is ready to receive information. It is clear that other delivery schedules may be applied without deviating from the scope of protection.

As discussed in context of FIG. 9, the application node may act to retrieve the requested data items and deliver them to the requesting user terminal, as shown in FIG. 10. Alternatively, it may act as a mediator that enables the search for a data item and returns to the requesting user equipment one or more addresses from which the data item may be retrieved, but does not itself retrieve the data items. In such case step 1012 of FIG. 10 would illustrate the act of sending addresses $addr(di_n)$ to the requesting user terminal. The application node may assume either or both of the above roles, depending on the implementation. For example, the application node may be configured to retrieve the information from internal or external databases directly available to it, but for data items only stored in the user terminals, merely provide the address to the other communication endpoint from which the data item may retrieved.

Figure 11:
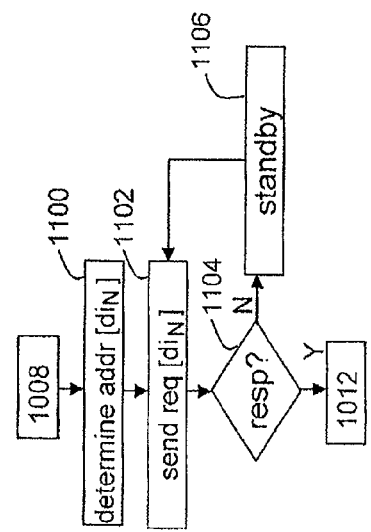
FIG. 11 illustrates a further embodiment in the application node.

However, in case the application node assumes the responsibility for retrieving the data item, the problem of accessibility of data items, as discussed in connection with FIG. 9, arises. FIG. 11 illustrates a procedure for overcoming the problem encountered in operating on a plurality of data storages whose availability for access varies uncontrollably. The procedure beings when the user equipment at step 1010 has received a request for a particular data item $di_N$ stored in a user terminal. The application node determines (step 1100) from the data item index registry the address of the data item. The address of the data item corresponds to an address of the user terminal where the data item is stored. The application node sends (step 1102) to the user terminal a message that indicates the identity of the data item and a request for retrieval of the data item. The application node checks (step 1104) whether a response is received within a defined period of time If the check is positive, it means that the communication endpoint is accessible, the response comprises the data item and the procedure may continue as in step 1012 of FIG. 10. If not, the communication endpoint is not accessible, and the retrieval is not successful. In response to a negative check, the user terminal initiates a standby procedure (step 1106) after which the request is resent to the communication endpoint. The standby procedure may be any procedure that keeps the data retrieval procedure automatically running such that whenever the communication endpoint becomes accessible again, the data item will be automatically retrieved and provided for consumption. Standby operation may comprise, for example, waiting for a predefined period before performing a new check. Other standby operations are possible without deviating from the scope of protection.

A group of conditions related to the indexing information elements and used for restricting the amount of data items may be combined into a search profile such that a search for data items on a particular point of interest may be easily searched at any time. For example, an interested fisherman may create a profile that follows the availability of data items in subareas crossed by the river of FIG. 8A and/or in the near vicinity of the river. Correspondingly, fishermen may agree that best catches will be photographed and shared through the application service. By activating the created profile, the fisherman may quickly browse the available pictures and be fully aware of the latest triumphs of the fellow fishermen. As another example, a person who drives to work along the road in FIG. 8A may create a profile that follows the availability of data items in the subareas through which the road passes. By making a search using this profile, the user may access first hand knowledge on occurrences, like accidents, in the road and whenever necessary reroute the drive.

Figures 12A, 12B, 13:
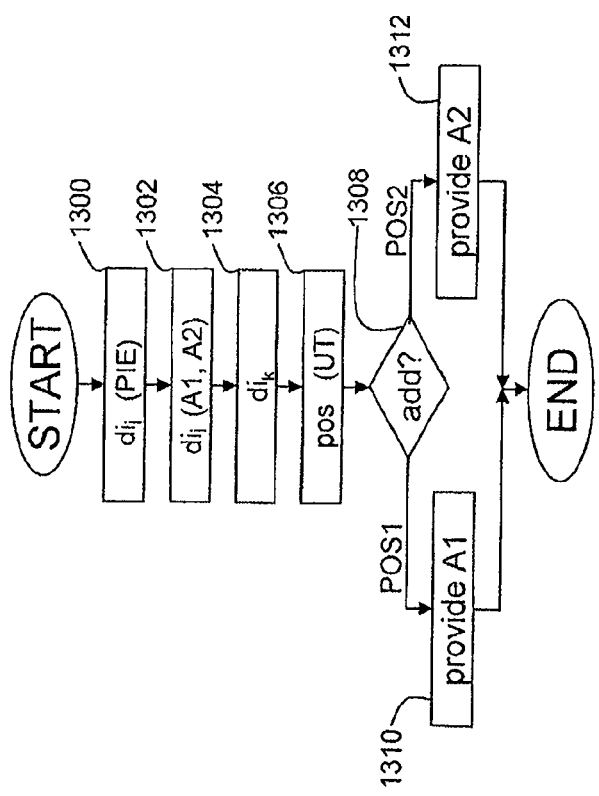
FIGS. 12A and 12B illustrate schematically alternative configurations of a basic data item.
FIG. 13 illustrates a basic procedure for provision of associated data items to the user terminal.

Typically, after a data item has been created and indexed its content cannot be changed anymore. A further embodiment of the invention enables interaction between users that have retrieved the data item. FIG. 12A illustrates schematically the configuration of a basic data item. The data item comprises a user data part UDIE that includes one or more user data information elements, and an indexing data part, which comprises a position information part PIE that includes one or more position data information elements and additional information part AIE that includes one or more additional information elements applicable for scoping the searches as discussed in connection with FIG. 7. FIG. 12B illustrates a data item applicable in a further embodiment of the invention. The data item comprises an editable information part E-UDIE that is configured such that the user may edit the existing content or add new content on top of the existing content. For example a user in Japan may submit a data item where the user information part comprises a picture of a comet X, the indexing data part comprises a codeword 'comet X', and the data item comprises an editable information part. In minutes another user in Sweden accesses the data item, adds an appreciative comment to the data item and resubmits the data item to the data item index registry. The application node detects that the data item is the same but the editable information part has been amended, and distributes the data item back to a defined group of user that have accessed the data item. The defined group may comprise, for example, all users that have accessed the data item, or the creator of the data item and any user that has earlier commented the data item. Other distribution schemes may be applied within the scope of protection. The arrangement allows instant contact and exchange of opinions for various parties interested in same topics. Thus, in addition to improving the possibilities to search interesting content, the solution provides a way to search for communicating parties with similar interests.

According to a further aspect of the invention, FIG. 13 illustrates a basic procedure for provision of associated data items to the user terminal. The possibility to provide further data items, for example advertisements, selected according to the codewords used in the search of data items has been conventionally used to create a commercial basis for provision of the data item distribution service. This mechanism provides a clear and quick procedure that allows advertises to focus their important information to target groups that are interested in the areas to which the codewords may be related. Another state of the art mechanism is provision of location-based information in cellular systems. For example, in a location based service, a user registered to a particular cell and requesting information on nearby restaurants may be positioned by the system and identity information on restaurants in the current cell and the neighboring cells is provided for his perusal.

These mechanisms can be significantly improved by further focusing the content of the information such that is more compatible with the possibilities to use the information. For example, an bar owner in Thailand might be interested to forward to a user that searched and retrieved a data item about a nearby beach an advertising invitation to, his bar. This information would, on the other hand, not be that interesting to a user that at the time of retrieving the data item was in the USA. However, a US travel agent selling vacations to a resort at that beach, would most likely be willing to provide some more information on their services to the user.

In line with the set example, the procedure of FIG. 13 starts at a situation where a user terminal has subscribed the service and the application program is running in the user terminal. The application node records a continuous accumulation of data items $di_i$, the indexing data of which includes a position information element (step 1300). Additionally, in the application node the data item is associated with at least two additional data items $A_1, A_2$, for example, advertisement data items (step 1302). When a user terminal retrieves (step 1304) a data item $di_K$, using the procedures disclosed in the examples above, the application node determines (step 1306) the position of the user terminal that retrieved the data item, and on the basis of the position determines (step 1308) which of the additional data items to provide to the consuming user terminal.

For example, if the position of the user terminal is POS1 that is within a defined range from the bar, additional data item $A_1$, for example an invitation to the happy hour in the same evening, is provided (step 1310) to the user terminal along with the data item. On the other hand, if the position of the user terminal is POS2 that is within a defined range from a particular travel agent, additional data item $A_2$, for example an advertisement and a quick link to the travel agents contact information, is provided to the user terminal along with the data item. Thus a data item associated with one position information may be used to deliver different types of messages to users in different geographical positions.

It will be obvious to a person skilled in the art that, as the technology advances, the inventive concept can be implemented in various ways. The invention and its embodiments are not limited to the examples described above but may vary within the scope of the claims.

The invention claimed is:

1. A method for providing and distributing information, the method comprising:

contracting in a plurality of mobile user terminals of a telecommunication system a distribution policy for data items, the distribution policy of each respective mobile user terminal defining automatic accessibility of data items generated by adopting output information from an application running in the respective mobile user terminal to other ones of said plurality of mobile user terminals contracting a same distribution policy;

generating in the mobile user terminal each data item by adopting the output information from an application running in the mobile user terminal;

marking, in each of said plurality of mobile user terminals, data items adopted from the application output automatically accessible to other ones of said plurality of mobile user terminals contracting the same distribution policy when the data item is created in a defined geographic area;

annotating, in each of said plurality of mobile user terminals, the data items with a geographical position information element;

generating, in each of said plurality of mobile user terminals, for data items an indexing record, an indexing record of a data item including the geographical position information element;

configuring, in the mobile user terminals, at least one transmission state, a transmission state corresponding with an operational state of the mobile user terminal during which transmission one or more of the data items from the mobile user terminal is allowed;

sending the indexing records of each of said plurality of mobile user terminals to an application node storing the indexing records of said plurality of mobile user terminals contracting the same distribution policy only when the mobile user terminal is in a transmission state;

providing, in at least one of said plurality of mobile user terminals contracting the same distribution policy, geographical position selection view based on the indexing records stored in the application node, the geographical position selection view comprising a number of separate coordinate elements dividing the geographic area into a mesh of subareas, the contrast or brightness or color of the coordinate elements on the map view varying according to the proportion of interesting data items, whose display is filtered in accordance with setting in a search profile that:
 i) restricts an amount of the interesting data items in each specific subarea and
 ii) follows the availability of the interesting data items in each specific subarea, based on geographical position information elements of the indexing records of said plurality of mobile user terminals stored in the application node, each coordinate element corresponding to at least one geographical position information element;

determining the address of one of the plurality of mobile user terminals that contains a data item listed in the search results;

requesting the data item from the mobile user terminal that contains the listed data item when it is determined the user terminal is available and periodically retrying the request when it is determined that the addressed mobile user terminal is not available;

adding a comment to a data item provided in response to the request; and redistributing the commented data item to a group of users that have accessed the commented data item.

2. A method for providing and distributing information according to claim 1, further comprising:
 connecting through a cellular network said plurality of mobile user terminals to said application node;
 recording in the application node indexing records of data items of the plurality of mobile user terminals;
 providing the recorded data items for searching to the plurality of mobile user terminals;
 receiving from the at least one of said plurality of mobile user terminals a request for a searched data item of one of said plurality of mobile user terminals;
 checking the availability of the requested data item from said one of said plurality of mobile user terminals;
 initiating, in response to the requested data item not being available, a follow-up procedure for detecting an instance when the requested data item becomes available in said one of said plurality of mobile user terminals;
 receiving a notification from said one of mobile user terminals in response to said one of said plurality of mobile user terminals registering with the cellular network;
 retrieving the requested data item from one of said plurality of mobile user terminals in response to detecting the notification; and
 providing the retrieved data item to said at least one of said mobile user terminal.

3. The method for providing and distributing information according to claim 2, further comprising
 recording data items of mobile user terminal, storing generated data items and transmitting the data items only at predefined transmission states;
 storing received data items in a database accessible by the application node;
 checking the availability of the data item first from a database; and
 checking the availability of the data item stored in the mobile user terminal, in response to the data item not being available in the database.

4. The method for providing and distributing information according to claim 2, further comprising
 receiving from said at least one of said plurality of mobile user terminals information for determining at least one geographical position information element of a data item; and
 sending information on the data item, an indexing record of which includes the determined geographical position information element.

5. The method for providing and distributing information according to claim 4, further comprising
 defining a filter that includes at least one filter condition for at least one further information element included in the indexing records of the data items; and
 sending information only on data items, the indexing record of each of which comprises the at least one further information element that fulfils the at least one filter condition.

6. The method for providing and distributing information according to claim 5, wherein
 the filter condition includes a requirement for at least one of the following information elements:
 time of generation of the data item,
 type of source of the data item,
 size of the data item,
 search term associated with the data item,
 media type of the data item,
 output device type definition associated with the data item, capabilities of output device related to the data item reflecting to data item itself,
location of the data item,
location where the data item was created,
type of data item,
annotation of data item, and
private or public status of data item.

7. The method for providing and distributing information according to claim 2, further comprising
storing values of one or more information elements in the indexing record of one or more data items parallelly or subsequently requested by said at least one of said plurality of mobile user terminals into a search profile.

8. The method for providing and distributing information according to claim 2, further comprising
receiving a search profile comprising values of one or more information elements in the indexing record of one or more data items parallelly or subsequently requested by said at least one of said plurality of mobile user terminals.

9. The method for providing and distributing information according to claim 7, further comprising
searching for data items fulfilling the search profile at defined intervals through the telecommunication system.

10. The method for providing and distributing information according to claim 1, further comprising:
providing the indexing records of each of said plurality of mobile user terminals in an application node;
associating in the application node the data items with at least two additional data items;
determining a geographical position of said at least one of said plurality of mobile user terminals;
selecting at least one of the at least two additional data items to be output to said at least one of said plurality of mobile user terminals viewing the data item according to the geographical position of said at least one of said plurality of mobile user terminals.

11. A method for providing and distributing information, the method comprising:
contracting in a mobile user terminal of a telecommunication system a distribution policy for data items, the distribution policy defining automatic accessibility of data items generated by adopting output information from an application running in the mobile user terminal to a plurality of other mobile user terminals contracting the same distribution policy;
generating in the mobile user terminal each data item by adopting output information from an application running in the mobile user terminal;
marking in the mobile user terminal each generated data item adopted from the application output automatically public, the public marking indicating that said plurality of other mobile user terminals may inherently access the generated data item according to the contracted distribution policy;
annotating, in the mobile user terminal, each data item with a geographical position information element;
generating, in the mobile user terminal, an indexing record for each data item including the geographical position information element;
configuring, in the mobile user terminal, at least one transmission state corresponding with an operational state of the mobile user terminal during which transmission of one or more of the data items from the mobile user terminal is allowed;
sending the indexing record for each data item to an application node also storing indexing records of said plurality of other mobile user terminals contracting the same distribution policy only when the mobile user terminal is in a transmission state; and
providing, in the mobile user terminals, a geographical position selection view based on the indexing records stored in the application node, the geographical position selection view comprising a number of separate coordinate elements dividing the geographic area into a mesh of subareas, the contrast or brightness or color of the coordinate elements on the map view varying according to the proportion of interesting data items, whose display is filtered in accordance with setting in a search profile that:
i) restricts an amount of the interesting data items in each specific subarea and
ii) follows the availability of the interesting data items in each specific subarea, based on geographical position information elements of the indexing records of said plurality of mobile user terminals stored in the application node, each coordinate element corresponding to at least one geographical position information element;
determining the address a mobile user terminal that contains a data item listed in the search results;
requesting the data item from the mobile user terminal that contains the listed data item when it is determined the user terminal is available and periodically retrying the request when it is determined that the addressed mobile user terminal is not available;
adding a comment to a data item provided in response to the request; and
redistributing the commented data item to a group of users that have accessed the commented data item.

12. The method for providing and distributing information according to claim 11, further comprising
storing the generated data items in the mobile user terminal;
configuring the mobile user terminal with at least one transmission state, a transmission state corresponding with an operational state of the mobile user terminal during which transmission of one or more of the data items from the mobile user terminal is allowed; and
preventing transmission of the data items from the mobile user terminal during operational states that do not correspond with any of the transmission states.

13. The method for providing and distributing information according to 12, further comprising
allowing transmission of indexing records during operational states that do not correspond with any of the transmission states.

14. The method for providing and distributing information according to claim 11, further comprising
storing generated data items in the mobile user terminal;
configuring the mobile user terminal with at least one indexing state, the indexing state corresponding with an operational state of the mobile user terminal during which generation of the indexing records for the data items is allowed; and
preventing generation of the indexing records during operational states that do not correspond with any of the indexing states.

15. The method for providing and distributing information according to claim 14, further comprising
configuring an indexing state to correspond with an idle state of the mobile user terminal, the idle state of the mobile user terminal being an operational state during which the mobile user terminal is not sending or receiving user data through the telecommunication system.

16. The method for providing and distributing information according to claim 11, further comprising
annotating each data item with a geographical position information element; and
including the geographical position information elements in the indexing record.

17. method for providing and distributing information according to claim 11, further comprising
contracting the distribution policy for data items in form of an application program executed in the mobile user terminal.

18. The method for providing and distributing information according to claim 17, further comprising
storing the generated data items in the mobile user terminal; and
sending to an application node a notification when entering the telecommunication system.

19. The method for providing and distributing information according to claim 18, wherein
the contracting the distribution policy is in a mobile user terminal of a cellular network, and
the sending the notification to the application node is from the mobile user terminal in response to registering with the telecommunication system.

20. A method for providing and distributing information in a mobile user terminal of a telecommunication system, the method comprising:
contracting a distribution policy for data items, the distribution policy defining automatic accessibility to data items comprising output information from applications running in a plurality of other mobile user terminals contracting the same distribution policy, each of the data items having an associated indexing record comprising at least one geographical position information element of the respective one of said plurality of other mobile user terminals in which the data item, is generated and the time it is generated and having been marked automatically accessible when the data items were created in a defined geographic area, the indexing records of said plurality of other mobile user terminals being stored in an application node;
configuring, in the plurality of other mobile user terminals, at least one transmission state corresponding with an operational state of the plurality of other mobile user terminals during which transmission of one or more of the data items from the plurality of other mobile user terminals is allowed, the plurality of other mobile user terminals only sending indexing records to the application node when the plurality of mobile user terminals are in transmission state;
providing a selection view for selecting a number of coordinate elements dividing the geographic area into a mesh of subareas, the contrast, brightness or color of the coordinate elements on the map view varying according to the proportion of interesting data items of said plurality of other mobile user terminals, whose display is filtered in accordance with settings in a search profile that:
  i) restricts an amount of the interesting data items in each specific subarea, and
  ii) follows the availability of the interesting data items in each specific subarea, based on geographical position information elements of the indexing records of said plurality of other mobile user terminals stored in the application node, each coordinate element corresponding to at least one geographical position information element;
determining the address of one of the plurality of other mobile user terminals that contains a data item listed in the search results;
requesting the data item from the mobile user terminal that contains the listed data item when it is determined the user terminal is available and periodically retrying the request when it is determined that the addressed mobile user terminal is not available;
adding a comment to a data item provided in response to the request; and
redistributing the commented data item to a group of users that have accessed the commented data item; and
retrieving through the telecommunication system the data items selected through the selection view.

21. The method according to claim 20, further comprising
sending, in response to a selection of a coordinate element, to the telecommunication system information for determining at least one geographical position information element that corresponds to the selected coordinate element; and
receiving from the telecommunication system information on at least one data item, an indexing record of which includes the determined geographical position information element.

22. The method according to claim 20, further comprising
defining for information retrieval a filter that includes at least one filter condition for at least one further information element included in indexing records of the data items; and
providing in the selection view only data items, the indexing record of each of which comprises the at least one further information element that fulfils the at least one filter condition.

23. The method according to claim 22, further comprising
including in the filter condition a requirement for at least one of the following information elements: type of the data item, time of generation of the data item, type of source of the data item, size of the data item, search term associated with the data item, media type of the data item, output device type definition associated with the data item.

24. The method according to claim 20, further comprising
providing the selection view in form of a map comprising a number of map coordinate elements, and data items being shown as visual indications in place of the corresponding map coordinate elements.

25. The method according to claim 23, further comprising
providing before the selection view a further selection view for selecting a group of coordinate elements from a number of groups of coordinate elements.

26. The method according to claim 23, further comprising
defining for information retrieval a filter that includes at least one filter condition for at least one further information element included in indexing records of the data items;
providing before the selection view a further selection view for selecting at least one filter condition for the filter; and
providing in the selection view only data items, the indexing record of each of which comprises the at least one further information element that fulfils the at least one filter condition.

27. The method according to claim 20, further comprising
utilizing a data item in at least one of the following ways:
outputting the data item through a user equipment device of the mobile user terminal, initiating a communication session by activating a link included in the data item.

28. The method according to claim 20, further comprising storing values of one or more information elements in indexing records of the selected data items into a search profile.

29. The method according to claim 28, further comprising sending the search profile to an application node accessible through the telecommunication system.

30. The method according to claim 28, further comprising sending a request for data items fulfilling the search profile at defined intervals through the telecommunication system.

31. A system comprising a plurality of mobile user terminals and a network node, wherein
   each of said plurality of mobile user terminals contracts distribution policy for data items, the distribution policy of each respective mobile user terminal defining automatic accessibility of the data items generated by adopting output information from an application running in the respective mobile user terminal to other ones of said plurality of mobile user terminals contracting the same distribution policy;
   each data item is generated in the mobile user terminals by adopting output information from an application running the mobile user terminals;
   each of said plurality of mobile user terminals marks data items adopted from the application output automatically accessible to other ones of said plurality of mobile user terminals contracting the same distribution policy when the data items are created in a defined geographic area;
   each of said plurality of mobile user terminals annotates the data items with a geographical position information element;
   each of said plurality of mobile user terminals generates for data items an indexing record, an indexing record of a data item including the geographical position information element;
   each of said plurality of mobile user terminals has at least one transmission state corresponding with an operational state of the mobile user terminals during which transmission of one or more of the data items from the mobile user terminal is allowed;
   each of said plurality of mobile user terminals sends, only when in a transmission state, its indexing records at least to the application node storing the indexing records of said plurality of mobile user terminals contracting the same distribution policy;
   at least one of said plurality of mobile user terminals outputs a selection view based on the indexing records stored in the network node, the geographical position selection view comprising a number of separate coordinate elements dividing the geographic area into a mesh of subareas, the contrast or brightness or color of the coordinate elements on the map view varying according to the proportion of interesting data items, whose display is filtered in accordance with settings in a search profile that:
      i) restricts an amount of the interesting data items in each specific subarea, and
      ii) follows the availability of the interesting data items in each specific subarea, based on geographical position information elements of the indexing records of said plurality of mobile user terminals stored in the network node, each coordinate element corresponding to at least one geographical position information element;
   at least one of said plurality of mobile user terminals:
      i) determines the address of one of the plurality of mobile user terminals that contains a data item listed in the search results,
      ii) requests the data item from the mobile user terminal that contains the listed data item when it is determined the user terminal is available and periodically retrying the request when it is determined that the addressed mobile user terminal is not available,
      iii) adds a comment to a data item provided in response to the request, and
      iv) redistributes the commented data item to a group of users that have accessed the commented data item.

32. The system according to claim 31 wherein the network node is an application node comprising an interface unit, a memory and a processor module connected to the interface unit and the memory and configured with instructions to cause the application node to:
   record indexing records of data items of the plurality of mobile user terminals applying the distribution policy for data items;
   provide the recorded data items for searching to the plurality of mobile user terminals applying the distribution policy for data items;
   receive from at least one of said plurality of mobile user terminals a request for a searched data item of one of said plurality of mobile user terminals;
   check the availability of the requested data item from said one of said plurality of mobile user terminals;
   initiate, in response to the data item not being available, a follow-up procedure for detecting an instance when the requested data item becomes available in said one of said plurality of mobile user terminals;
   receive a notification from said one of said plurality of mobile user terminals in response to said one of said plurality of mobile user terminals registering to the communication system;
   retrieve the requested data item from said one of said plurality of mobile user terminals in response to detecting the notification; and
   provide the retrieved data item to said at least one mobile user terminal.

33. A mobile user terminal comprising an interface unit, a memory and a processor module connected to the interface unit and the memory, and configured with instructions to cause the mobile user terminal to:
   contract a distribution policy for data items, the distribution policy defining automatic accessibility of the data items generated by adopting output information from an application running in the mobile user terminal to a plurality of other mobile user terminals contracting the same distribution policy;
   generate data items by adopting output information from an application running in the mobile user terminal;
   mark each data item automatically public, the public marking indicating that said plurality of other mobile user terminals may inherently access the data item according to the contracted distribution policy when the data item is created in a defined geographic area;
   annotate each data item with a geographical position information element
   generate an indexing record on each data item including the geographical position information element;
   generate at least one transmission state corresponding with an operational sate of the mobile user terminal during which transmission of one or more of the data items from the mobile user terminal is allowed;

provide the indexing record to an application node also storing indexing records of said plurality of other mobile user terminals contracting the same distribution policy only when in a transmission state;

provide a geographical position selection view based on the indexing records stored in the application node, the geographical position selection view comprising a number of separate coordinate elements dividing the geographic area into a mesh of subareas, the contrast or brightness or color of the coordinate elements on the map view varying according to the proportion of interesting data items, whose display is filtered in accordance with setting in a search profile that:

i) restricts an amount of the interesting data items in each specific subarea and ii) follows the availability of the interesting data items in each specific subarea, based on geographical position information elements of the indexing records of said plurality of mobile user terminals stored in the application node, each coordinate element corresponding to at least one geographical position information element;

determine the address of a mobile user terminal that contains a data item listed in a search result produced in accordance with the search criteria;

request the data item from the mobile user terminal that contains the listed data item when it is determined the user terminal is available and periodically retrying the request when it is determined that the addressed mobile user terminal is not available;

add a comment to a data item provided in response to the request; and redistribute the commented data item to a group of users that have accessed the commented data item.

34. A computer-readable storage medium for storing a computer executable instruction, which when executed by a computer, perform a method comprising:

contracting in each of a plurality of mobile user terminals of a telecommunication system a distribution policy for data items, the distribution policy of each respective mobile user terminal defining automatic accessibility of data items generated by adopting output information from an application running in the respective mobile user terminal to a plurality of other mobile user terminals contracting the same distribution policy;

generating in each of said plurality of mobile user terminals data items by adopting output information from an application running in the respective mobile user terminal;

marking in each of said plurality of mobile user terminals the data item adopted from the application output automatically public, the public marking indicating that other ones of said plurality of mobile user terminals may inherently access the data item according to the contracted distribution policy when the data item is created in a defined geographic area;

annotating the data item with a geographical position information element generating an indexing record on the data item including the geographical position information element;

configuring, in the mobile user terminals, at least one transmission state corresponding with an operational state of the mobile user terminal during which transmission of one or more of the data items from the mobile user terminal is allowed;

providing the indexing record to an application node storing the indexing records of said plurality of other mobile user terminals contracting the same distribution policy only when the mobile user terminals are in a transmission state;

providing, in at least one of said plurality of mobile user terminals contracting the same distribution policy, geographical position selection view based on the indexing records stored in the application node, the geographical position selection view comprising a number of separate coordinate elements dividing the geographic area into a mesh of subareas, the contrast or brightness or color of the coordinate elements on the map view varying according to the proportion of interesting data items, whose display is filtered in accordance with setting in a search profile that:

i) restricts an amount of the interesting data items in each specific subarea and ii) follows the availability of the interesting data items in each specific subarea, based on geographical position information elements of the indexing records of said plurality of mobile user terminals stored in the application node, each coordinate element corresponding to at least one geographical position information element;

determining the address of a mobile user terminal that contains a data item listed in a search result produced in accordance with the search criteria;

requesting the data item from the mobile user terminal that contains the listed data item when it is determined the user terminal is available and periodically retrying the request when it is determined that the addressed mobile user terminal is not available;

adding a comment to a data item provided in response to the request; and redistributing the commented data item to a group of users that have accessed the commented data item.

35. A mobile user terminal comprising an interface unit, a memory and a processor module connected to the interface unit and the memory and configured with instructions to contract a distribution policy for data items, the distribution policy defining automatic accessibility to data items comprising output information from an application running in a plurality of other mobile user terminals contracting the same distribution policy, each of the data items having an indexing record comprising at least one geographical position information element of respective ones of said plurality of other mobile user terminals in which the data item is generated at the time it is generated and having been marked automatically accessible when the data items were created in a defined geographic area, the indexing records of said plurality of other mobile user terminals being stored in an application node;

generate the data items by adopting the output information from an application running in the processor module;

configuring, in the mobile user terminal, at least one transmission state corresponding with an operational state of the mobile user terminal during which transmission of one or more of the data items from the mobile user terminal is allowed, the mobile user terminal only sending indexing records to the application node when the mobile user terminal is in a transmission state;

provide a selection view for selecting a number of coordinate elements, the first selection view being configured such that the first selection view comprises a group of coordinate elements dividing the geographic area into a mesh of subareas, the contrast, brightness or color of the coordinate elements on the map view varying according to the proportion of interesting data items of said plurality of other mobile user terminals, whose display is filtered in accordance with settings in a search profile that:
i) restricts an amount of the interesting data items in each specific subarea, and
ii) follows the availability of the interesting data items in each specific subarea, based on geographical position information elements of the indexing records of said plurality of other mobile user terminals stored in the application node, each coordinate element corresponding to at least one geographical position information element;

determine the address of one of a plurality of mobile user terminals that contains a data item listed in a search result;

requesting the data item from the mobile user terminal that contains the listed data item when it is determined the user terminal is available and periodically retrying the request when it is determined that the addressed mobile user terminal is not available;

adding a comment to a data item provided in response to the request; and redistributing the commented data item to a group of users that have accessed the commented data item;

retrieve the selected data items.

\* \* \* \* \*